United States Patent [19]

Nicosia et al.

[11] Patent Number: 6,088,949
[45] Date of Patent: Jul. 18, 2000

[54] INSECT CONTROL APPARATUS AND METHOD

[75] Inventors: James Nicosia, North Reading; Nicholas Reinhardt, Lexington; John Nicosia, Sr., North Reading; Neville Glenn, Milford, all of Mass.; Robert Vannrox, Woonsocket, R.I.; Don Swavely, Norton, Mass.

[73] Assignee: Nicosia and Reinhardt, Inc., North Reading, Mass.

[21] Appl. No.: 09/036,123

[22] Filed: Mar. 6, 1998

Related U.S. Application Data

[63] Continuation-in-part of application No. 08/910,535, Aug. 14, 1997, abandoned, which is a continuation of application No. 08/557,707, Nov. 13, 1995, Pat. No. 5,657,576.

[51] Int. Cl.⁷ .............................. A01M 1/00; A01M 1/10
[52] U.S. Cl. .............................. 43/107; 43/132.1
[58] Field of Search .............................. 43/107, 112, 114, 43/124, 132.1; 40/406; 381/89, 336; 367/139; 340/384.2; 181/0.5, 402, 110, 119, 120, 141, 198, 213, 214, 221, 222, 233, 235, 256

[56] References Cited

U.S. PATENT DOCUMENTS

| | | | |
|---|---|---|---|
| 2,415,832 | 2/1947 | Mason | 181/402 |
| 2,416,324 | 2/1947 | Klein | 181/402 |
| 2,481,358 | 9/1949 | Smith | 40/406 |
| 3,123,176 | 3/1964 | Greenberg | 181/198 |
| 3,136,380 | 6/1964 | McCoy et al. | 381/198 |
| 3,270,305 | 8/1966 | Glassanos | 181/198 |
| 3,376,660 | 4/1968 | McGinnis . | |
| 3,387,396 | 6/1968 | Smith | 40/406 |
| 3,602,329 | 8/1971 | Bauer | 181/129 |
| 3,796,001 | 3/1974 | Jackson | 43/113 |
| 3,891,962 | 6/1975 | White | 43/107 |
| 3,979,140 | 9/1976 | Silverman et al. | 181/119 |
| 4,038,499 | 7/1977 | Yeaple | 381/336 |
| 4,078,632 | 3/1978 | Horsman | 181/119 |
| 4,086,720 | 5/1978 | Wiser | 43/113 |
| 4,168,591 | 9/1979 | Shaw | 43/114 |

(List continued on next page.)

FOREIGN PATENT DOCUMENTS

| | | |
|---|---|---|
| 3225412A1 | 1/1984 | Germany . |
| 666789 A5 | 8/1988 | Switzerland . |
| 1059823A | 4/1992 | Switzerland . |
| WO 91/16818 | 11/1991 | WIPO . |

*Primary Examiner*—Michael J. Carone
*Assistant Examiner*—Darren W. Ark
*Attorney, Agent, or Firm*—Hamilton, Brook, Smith & Reynolds, P.C.

[57] ABSTRACT

A method and apparatus for attracting insects, especially black flies, sand flies and mosquitoes, in which the physical effects associated with the skin areas of prey-animals are simulated. Basic elements of a first embodiment of the apparatus include warmed elastic-walled holders of pulsed fluid which may be in the form of elastic tubing through which warm fluid flows in pulses arranged to produce various physical effects. Power for fluid heating and pulsing action may be provided by solar electrical, mechanical, nuclear, chemical or other source. Basic elements of a second embodiment of the apparatus include a weak spring suspended from a support and coupled to a vibration generator. The spring includes a deformable skin-like membrane therearound. Vibration is imparted to the spring and transmitted to the membrane to produce physical effects associated with movement of a skin surface of a prey animal. A heater may also be provided to heat the skin-like surface. A still further embodiment includes an exciter and a traveling wave transmitting member. The exciter is moved relative to the traveling wave transmitting member to impart a traveling wave therein to attract insects to the apparatus. Killing of insects or collection of live or dead insects may be accomplished by trapping or execution electrically, mechanically, or chemically. In a preferred embodiment, the wave transmitting member and collector/killer element are combined into an integral unit. This unit may be removed and replaced as necessary.

10 Claims, 7 Drawing Sheets

U.S. PATENT DOCUMENTS

| | | | |
|---|---|---|---|
| 4,185,714 | 1/1980 | Pascouet et al. | 181/120 |
| 4,268,719 | 5/1981 | Manger | 381/89 |
| 4,493,161 | 1/1985 | Soloway et al. | 43/107 |
| 4,734,891 | 3/1988 | McGowan et al. | 181/110 |
| 4,805,728 | 2/1989 | Carter et al. | 181/141 |
| 4,821,838 | 4/1989 | Chen | 181/198 |
| 4,852,296 | 8/1989 | Swanson et al. | 43/112 |
| 4,905,406 | 3/1990 | Warner | 43/107 |
| 4,907,366 | 3/1990 | Balfour | 43/132.1 |
| 4,923,032 | 5/1990 | Nuernberger | 181/141 |
| 4,963,854 | 10/1990 | Stuecker | 181/141 |
| 4,998,091 | 3/1991 | Rezmer | 340/384.2 |
| 5,088,576 | 2/1992 | Potthoff et al. | 181/290 |
| 5,105,394 | 4/1992 | Percy | 181/402 |
| 5,131,052 | 7/1992 | Hill et al. | 381/336 |
| 5,142,499 | 8/1992 | Fletcher | 367/20 |
| 5,175,960 | 1/1993 | Wade et al. | 43/139 |
| 5,183,974 | 2/1993 | Wilhelm et al. | 181/0.5 |
| 5,205,064 | 4/1993 | Nolen | 43/112 |
| 5,205,065 | 4/1993 | Wilson et al. | 43/107 |
| 5,218,176 | 6/1993 | Meyer, Jr. | 181/99 |
| 5,222,322 | 6/1993 | Mastromonaco | 43/139 |
| 5,241,778 | 9/1993 | Price | 43/132.1 |
| 5,255,468 | 10/1993 | Cheshire, Jr. | 43/113 |
| 5,258,176 | 11/1993 | Keenan | 424/84 |
| 5,274,199 | 12/1993 | Uryu et al. | 181/169 |
| 5,274,949 | 1/1994 | Beaton | 43/122 |
| 5,311,697 | 5/1994 | Cavanaugh et al. | 43/132.1 |
| 5,339,564 | 8/1994 | Wilson et al. | 43/107 |
| 5,369,625 | 11/1994 | Gabrielson | 181/120 |
| 5,425,644 | 6/1995 | Szinicz | 434/268 |
| 5,528,049 | 6/1996 | Callahan | 250/493.1 |
| 5,536,910 | 7/1996 | Harrold et al. | 181/290 |
| 5,595,018 | 1/1997 | Wilbanks | 43/112 |
| 5,634,797 | 6/1997 | Montgomery | 434/268 |
| 5,647,164 | 7/1997 | Yates | 43/139 |
| 5,657,576 | 8/1997 | Nicosia | 43/132.1 |
| 5,664,020 | 9/1997 | Goldfarb et al. | 381/89 |
| 5,669,176 | 9/1997 | Miller | 43/139 |
| 5,679,005 | 10/1997 | Einstein | 434/268 |
| 5,734,728 | 3/1998 | Meissner | 381/89 |
| 5,778,576 | 7/1998 | Kaviani | 40/406 |
| 5,779,484 | 7/1998 | Lampotang et al. | 434/266 |
| 5,799,436 | 9/1998 | Nolen et al. | 43/112 |
| 5,839,904 | 11/1998 | Bloom | 434/268 |
| 5,883,341 | 3/1999 | Terriss et al. | 181/141 |
| 5,943,815 | 8/1999 | Paganessi et al. | 43/107 |

INSECT CONTROL APPARATUS AND METHOD

RELATED U.S. APPLICATIONS

This application is a continuation-in-part of U.S. application Ser. No. 08/910,535, filed Aug. 14, 1997, now abandoned, which is a continuation of U.S. application Ser. No. 08/557,707, filed Nov. 13, 1995, now U.S. Pat. No. 5,657,576.

BACKGROUND OF THE INVENTION

This invention relates in general to the control of insects, and in particular to the attracting of harmful insects such as mosquitoes, black flies, sand flies and the like for purposes of monitoring, capturing, or killing them.

The need for insect control is well established and is probably best exemplified by the history of mosquito control. In the 19th-century Dr. Donald Ross of the British Army in India proved that malaria is spread by mosquitoes. At the turn of the century, the work of Dr. Walter Reed on controlling yellow fever during construction of the Panama Canal became famous. Since that time, despite intensive efforts by public health authorities everywhere, elimination of malaria and other mosquito-borne diseases has not been possible, largely because of the difficulty of eliminating mosquitoes. Now the world is faced with frightening outbreaks of incurable or newly drug-resistant mosquito-borne diseases, underlining the need for effective mosquito control measures, including means to capture, monitor, or destroy active adult individual specimens.

It is not only in the suppression of disease that controls are needed. There is the perennial call for abatement of the nuisance of mosquito and black fly bites, which make unprotected outdoor activities all but impossible at certain seasons of the year in many parts of the world.

Since mosquitoes and biting flies appear in vast numbers over wide areas, and readily evade any physical means of killing them, hunting them down individually or collecting them by simple mechanical means is not practical. With regard to mosquitoes, currently effective methods of control can only attack the population as a whole by chemical or bacterial means, or seek to remove their breeding sites. These methods are cumbersome, labor-intensive, and often politically disruptive, in that they may introduce dangerous amounts of toxic chemicals into the environment, kill harmless or beneficial creatures and destroy wetlands. At best they are only palliative in nature.

Some attempts have been made to isolate and refine the elements serving to attract various animals, including insects, in order to construct traps. In particular, for trapping mosquitoes, light, color-contrast, warmth, carbon dioxide, octenol, water vapor, lactic acid, sound, and several more complex organic chemicals have been used as attractants.

Thus, traps exist, but traps currently in use require maintenance and resupply of consumables, and can be inhumane where live animals or persons are used as bait. Worse, they do not work very well. Certain traps are useful for monitoring mosquito populations and trapping live individuals for scientific purposes such as making virus assays, but the presently available traps, being usable only at certain times of days or seasons of the year, and then only on certain species of mosquito, are not themselves suitable for control purposes. Some of the control methods and traps in current use have the further disadvantage of killing large numbers of harmless and beneficial insects with resulting damage to the food chain.

In addition to the large-scale control measures in which attractant-based traps are legitimately used for guidance and monitoring, there has been no shortage of consumer bug control devices promoted for killing or repelling mosquitoes. These include bug "zappers", scented candles, floor washes, yellow light bulbs, vacuum and suction mechanical devices, electronic sound generators, wingbeat buzzers, etc. All these items are not really effective in practical terms, but continue to be sold on the unfulfilled promise that they will accomplish some good. Some, such as blue-light bug "zappers" kill hundreds of harmless or beneficial insects for every mosquito killed, and hence may actually do harm.

Unlike prior art devices, the present invention provides a solution useful in large-scale and research operations for disease control as well as in domestic and personal areas in the form of an inexpensive and effective device to concentrate and gather up mosquitoes and black flies for purposes of study, capture, nuisance-abatement, or extermination. In comparative trials, the present invention has been shown to be capable of attracting multiple species of mosquito at rates at least an order of magnitude better than standard traps, with only minimal hazard to harmless and beneficial insects. The devices of the present invention have also been shown to attract insects preferentially in sufficient numbers to create a zone of protection for people or animals in the vicinity.

SUMMARY OF THE INVENTION

The present invention is organized about the concept of simulating simple physical effects produced and transmitted by the skin of living animals. These effects, similar to others used throughout the animal kingdom for detecting the presence, location, animation, and state of mind of potential prey, mates, rivals, or predators, variously engender in animals receiving them the qualities and behaviors of arousal, pacification, attraction, or repulsion. With the present invention, in the specific case of mosquitoes, sand flies and black flies, it is possible to induce motion toward the source of the effects, or "attraction", followed by approach and landing of the insects within a predetermined area where they may more readily be dealt with.

The present invention is essentially an effective means for utilizing certain heretofore unappreciated attractive qualities of the skin of a live target as perceived by mosquitoes, black flies, and other biting insects. This invention has been found capable of attracting them from many meters away in numbers sufficient to be useful for control purposes, via a roughly accurate simulation of the physical effects appearing at the surface of the skin of a living prey animal. These effects may be a consequence of the slight motions, vibrations, and heat variations produced by the circulatory systems, the musculature, and viscera beneath the skin of prey animals. These motions and variations are readily detected by the insects as part of their repertoire of prey-finding capabilities. A simulator of the temporally and spatially patterned and unpatterned changes in physical position, and the roughly corresponding patterned, unpatterned, and changing temperatures of the skin surface encountered in a living animal, has been found to make a particularly effective attractant for mosquitoes and black flies, thus making it possible to build the equivalent of live-animal-baited mosquito-traps of any reasonable size, for use in research, nuisance abatement, and disease control applications.

The method and apparatus of the present invention involves providing one or more outputs capable of recreating the positional and thermal "signature" of the skin of a living animal, as such skin is influenced by the pulsing or flow of blood in the dermal and subdermal (i.e. interior) vasculature, and by small motions and heat developed by the musculature or viscera. As one possible embodiment, there has been provided a deliberately optimized and augmented fluid mechanical or electro-mechanical and thermal apparatus for simulating the physical effects of living skin that attract mosquitoes and black flies. In a first embodiment, the device comprises a hybrid thermal/mechanical/electrical apparatus. In a second embodiment, the device comprises an all-mechanical or electro-mechanical apparatus. In particular, the invention attracts, and induces to arrive and land within a predetermined area, certain flying, biting insects, such as mosquitoes and black flies, thereby producing a desired local concentration and spatial arrangement of the individuals for purposes of study, counting, sequestration, immobilization, harvesting, or killing. It does this by presenting the positional and thermal "signatures" characteristically produced by the skin of live prey animals in such a way that flying insects are able to detect them and then become motivated to make their way toward the apparatus, and further, to land and attempt to bite it. They will do this even if the apparatus is covered by a heavy cloth.

By "positional signature" is meant the slight displacement of the skin surface due to the activities beneath, which may include localized pulsing or throbbing due to blood flow, more general movements due to voluntary or involuntary motions of the muscles or viscera, and vibrations generated by a living, breathing animal. Some of these skin displacements are area-wide; others are localized; similar outputs that present the detailed temporal and spatial displacement of the skin including the differential movements of localized portions thereof (i.e., in patterns thereon) are believed to contribute greatly to the positional signature's appeal to mosquitoes and black flies and enhance the overall attractive effect. The positional signature is poorly coupled acoustically to the surrounding air and does not generate acoustical vibrations detectable above thermal noise. The insects may detect positional signature by means such as detection of air displacements or reflection of sound of their own wing beats.

By "thermal signature" is meant both the generally-elevated skin temperature relative to ambient of warm-blooded (or active cold-blooded) animals, and the localized spatial and temporal variations thereto. The generally-elevated temperature part of the "thermal signature" is related to a generalized heating "body heat" due to voluntary and involuntary activities of the underlying muscles and viscera; the localized spatial and temporal variations thereof are due primarily to the pulsing or flow of blood in the underlying veins, capillaries, and arteries. As with the positional signature, outputs that present both the fine static and dynamic temporal and spatial distribution (patterns) of heat flux (due to temperature distribution changes and/or geometrical/positional changes), as well as the gross static or slowly changing temperature differences between the skin area and the surroundings, contribute greatly to the thermal signature's detectability by mosquitoes and black flies, and likewise enhance overall attractive effect. When an attractor supplying these signatures is in use, the individual insects can be seen to approach in a characteristic "splayed-out" or "open" flying configuration, and respond to details of the underlying pattern during approach and specifically to align themselves with features corresponding to physical effects appearing at the skin surface when positioning themselves to bite.

Also, in dealing with such sensitive creatures as mosquitoes and black flies, it is extremely important to suppress (or to refrain from generating) extraneous signals not characteristic of the positional and thermal signatures of prey-animal skin, such as mechanical pump noise, motor whine, cooling-fan air turbulence, transformer hum, electrical or magnetic field disturbances and the like. An unfortunate co-generation of such signals can significantly diminish or even negate the attractive effect.

On the other hand, if auxiliary attractants, such as those known in the prior art, are mixed appropriately with the output signatures of this invention, the attractive effect can be enhanced still further. Such enhancements are mere refinements, and are not an essential feature of this invention. However, such enhancements tend to provide a synergistic effect in attractive power in certain circumstances when combined with the present invention.

Broadly, the present invention is embodied in a deliberate recreation and optimization of the signature-creating elements of prey-animals which attract insects, particularly biting insects such as mosquitoes and black flies. This is achieved by imitating certain mechanical properties and spatial arrangements and movements of the skin. Fluid-mechanical apparatus, or a fully-mechanical or electromechanical device is used here to simulate action of the skin, including the spatial, mechanical and thermal effects produced by movements imparted thereon. These apparatuses may then be combined with a system for disposing of attracted insects such as a collector trap, an electrified grid, or other killing means. It is to be understood that this action and these effects can be produced by straight mechanical, straight electrical, or hybrid systems as well.

BRIEF DESCRIPTION OF THE DRAWINGS

For a better understanding of the present invention, together with other and further objects, features and advantages, reference should be made to the following description of a preferred embodiment which should be read in conjunction with the appended drawings in which.

DESCRIPTION OF PREFERRED EMBODIMENT

Figure 1:
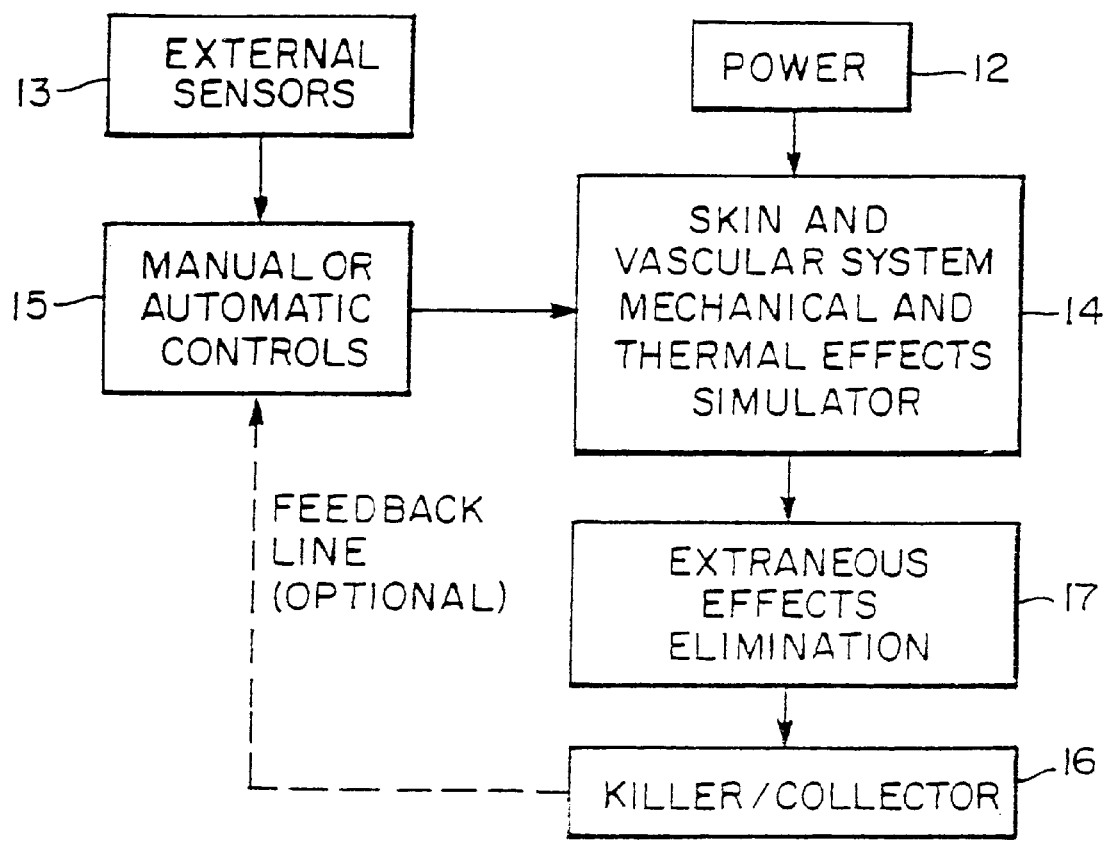
FIG. 1 is a block diagram of basic elements of the invention.

In FIG. 1, a simplified system is outlined. It includes a power source 12 which may be no more than a conventional outlet in more highly developed areas or may be as primitive as a bicycle-powered generator in undeveloped areas. In isolated areas, the power source may indeed preferably be solar or thermal depending upon availability in the area where the apparatus is to be used. Depending upon the specific embodiment of the invention, the power source provides power to a heating element, to a source of mechanical motion or to a pump and a killing or collecting apparatus.

Connected to the power source 12 is a key element of the invention, namely, the simulator or reproducer 14 of physical effects associated with animal skin and detectable by insects to be attracted. The simulator 14 may take many different forms and the invention is not intended to be limited to those specific embodiments described herein, but to include all the various forms which would be known to those of ordinary skill in the art. Also connected to the power source may be such elements as thermostats, timers, sensors and a filtering device for suppressing unwanted effects.

Depending upon the function being served by the apparatus, the element 16 may be a collector or a destroyer into which insects attracted by the simulator 14 are drawn under their own power of locomotion, or they may be forced there by any convenient means such as air flow, a mechanical sweep, or similar device located within a trap area into which the mosquitoes or black flies have been attracted.

It may at times be useful to have self-regulation of the device. To that end, information from timers or ambient condition sensors 13 and feedback information from the collector/destroyer 16 can be provided through the control 15 to the simulator 14.

In some situations, in addition to periodic shutdown of sources of noise such as those which might be generated by the simulator 14, it has proven desirable to include sound insulation, a filter or other extraneous eliminators of possibly disabling sounds. Such a device 17 is shown in FIG. 1 disposed for convenience between the simulator 14 and the killer-collector 16.

Figure 2:
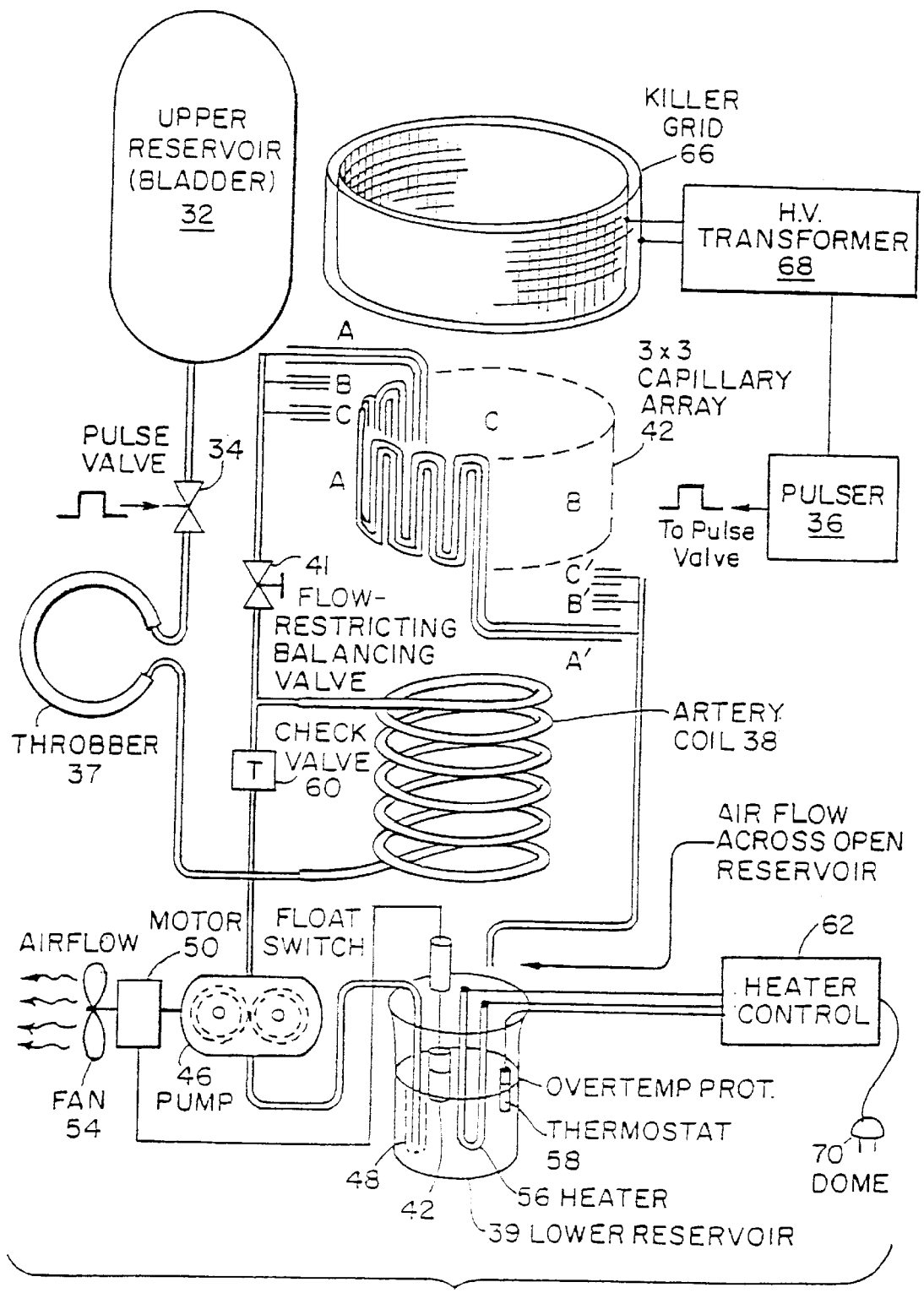
FIG. 2 is an idealized exploded view of one embodiment of the present invention.

FIG. 2 is an idealized exploded view of one embodiment of the present invention. There may be seen a supply reservoir 32 which may be a rubber bladder which contains a quantity of warm water. The supply reservoir 32 may be filled by a pump initially, but for extraneous signal suppression reasons its is considered desirable to discontinue pumping operation during the several minutes of time it takes to empty the reservoir 32 through the device during operation. A pulse valve 34 is connected to the outlet of the reservoir 32 and it is controlled in its operation by a pulse valve control 36. The pulse valve control 36 is programmed to open the valve 34 periodically, allowing the water to flow intermittently. Such an intermittent flow produces pressure waves due to both the static pressure head provided by the bladder 32, and the dynamic (ram) pressures developed when the water flow is interrupted by the pulse valve 34. In this fashion, pulses of warm water supplied to a simulated vascular system give rise to thermal and positional effects characteristic of the skin of an animal. The vascular system may consist of a throbber coil 37 which is formed of highly elastic, thin-wall, low-durometer, flexible tubing. The throbber coil 37 may actually consist of one or more free-standing loops of ¼" O.D. plastic or rubber tubing which tend to move spasmodically with the flow and interruption of water pulses. The tubing continues and is formed into a simulated arterial section composed of a number of turns of tubing 38. For convenience, these turns of tubing 38 may be wound on a water-tight cylindrical container 39. A parallel array 40 of finer flexible plastic or rubber tubes of about ⁵⁄₆₄" O.D. made to simulate capillaries is connected in parallel with the arteries 38. There is no need to simulate the actual branching and subdivision typical of the arteries in an animal vascular system. The important thing is to provide a finely detailed signature pattern superimposed on that of the "arterial" flow. The arteries 38 are wound about the cylindrical container 39 and a larger cylindrical sleeve 42 made of hardware cloth of about ½" mesh may be set up about the arteries.

The capillaries then are wound in a pattern through the mesh of the cylindrical sleeve 42 of hardware cloth, which winding may then be covered by a membrane, Turkish toweling, woven fabric or a loudspeaker grill cloth, or left exposed. A particularly effective covering for the device comprises cloth having alternating colored stripes to create a visual contrast known to appeal to certain species of biting insects. Preferably, the stripes are straight, vertically oriented black and white stripes. Alternatively, a barber-pole orientation of stripes or an arrangement of spots may be used. In yet a further embodiment, the cloth may comprise random strips of foil attached thereto for the purpose of breaking up the heat pattern emitted by the device. The random heat pattern helps to create the desired "thermal signature" of underlying muscles and viscera of the insect prey. In operation, pulses of warm water flow from the pulse valve 34, thence through the throbber 37 and through both the arteries and the capillaries to be discharged into the cylindrical container 39. A flow-restricting valve 41 serves to provide sufficient back pressure to ensure that the tubing physically distends during pulsing. Such distension is very important.

The cylindrical container 39 may be equipped with a water level control, including a float 43, a float switch 44, and a pump 46. An intake 48 may be provided for the pump and it is preferably disposed in a filter placed deep within the cylindrical container 39. The pump 46 may be driven by a motor 50 which also serves to drive a fan 54. The fan 54 cools the motor and may serve to disperse water vapor rising from the open-topped container 39 which may also serve to enhance the attractive function of the apparatus. A heater 56 and a temperature probe 58 are also disposed in the cylindrical container 39. As spent and cooled water accumulates in the container 39, the water is reheated by the heater 56 and is pumped back to the artery-capillary system through a check valve 60. Operation of the pump 46 and maintenance of proper water temperature is assured by a heater control 62 which is adjustable manually or by auxiliary timing and ambient-sensing controls. A killing grid 66 may be disposed concentrically about the simulated vascular system and it may be energized by means of a high-voltage transformer 68.

Power for the pulser 36, the pump motor 50, the heater 56 and the high-voltage transformer 68 may be provided by a conventional outlet or other source 70.

Figure 3:
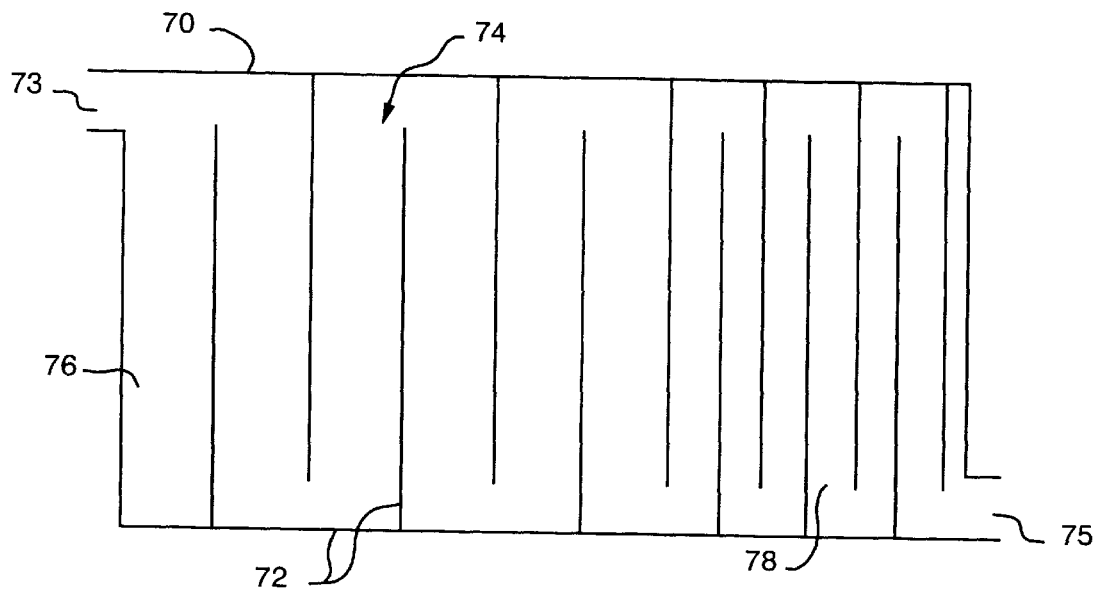
FIG. 3 is a side elevational view of an alternative tortuous fluid passageway for use in the present invention shown in FIG. 2.

The vascular system of the invention may take various forms. It is preferably an elastic-walled subdivided system consisting variously of "arteries", capillaries", and "veins" of different diameters and spacings roughly imitative of systems found in warm-blooded prey animals. Alternatively, the rubber tubing may be replaced by thin-walled flexible plastic or rubber sheets 70 superimposed on one another which are heat-welded together 72 to form a tortuous fluid path 74 therethrough as shown in FIG. 3. Those skilled in the art will appreciate that the tortuous fluid path 74 may take many varied forms other than that shown in FIG. 3. It may be more convenient to use this type of fluid path due to ease of manufacturing the plastic or rubber sheets. The sheets include openings 73, 75 for providing fluid thereto and may have fluid paths of varying sizes 76, 78 to provide proper flow restriction and simulate vasculature of animals, i.e. arteries and veins. The flat sheets 70 may be wrapped around the cylindrical container 39 and the fluid therein heated in the same manner as earlier described. These may be disposed beneath a membrane imitative of the outer skin surface of an animal, hidden behind a cloth grille, embedded in the elastic wall of a container or simply left standing bare and alone. It is believed that adequate attraction of insects occurs with a single size of tube or fluid passageway, but an array of varying sizes, spacings and elasticities give rise to a spatial frequency "signature" which the insects rely upon to some degree for near-field attraction and prey-seeking orientation.

Experience indicates that insects are definitely affected by the individual detailed elements of the "signature" when they are positioning themselves just before biting. Such signature details may be produced by a physical arrangement of the flexible "blood vessels" or even by covering a thin flat pulsating diaphragm with a perforated or slotted mask. Simulation of the detailed thermal and mechanical effects associated with natural living-animal skin is the desideratum. These effects include slight periodic differential movement from some slower-moving or static average position, a slightly elevated static or slow-moving average temperature, and a finely detailed pattern of differential temperatures and temperature changes.

Similarly, the pulsed flow of warm fluid in the vascular system of the present invention is designed to be similar to the flow of blood produced naturally by a beating heart. Such effects are associated with a periodic surge of fluid which normally is warm relative to ambient temperature through a system which may include periodic dilation of the vessels. This action changes the volume, area, and ability of the vessels to emit heat; it changes their position relative to each other and to the incoming mosquito; it also causes them to emit vibrations, possibly detectable by the insects. The results of such action may be transmitted directly by the vessels themselves, or they may be mediated by an overlying skin. For example, it is known that they can be perceived by the insects through a heavy cloth cover.

Similar to the pulsing of warm fluid, the present invention may utilize a gel, semi-solid or similar consistency substance which is contained within the rubber tubes or plastic sheet passageways. The gel would not necessarily flow through the container, but rather, the gel may be actuated to create a wave to travel therethrough to simulate fluid flow or the "positional signature". Accordingly, components such as the pump, check valve and motor may be replaced by a device to create a traveling wave in the gel, e.g. a mechanical hammer, electrical pulse or a vibratory device.

Throbbing of the vessels may be exhibited by the free-standing loop of artery tubing 37 which moves under Bourdon-tube forces which tend to straighten the loop out at each pressure pulse. Alternatively, the throbber loop 37 may be constructed from a mechanical vibratory device, such as a spring or straps of spring steel which can be activated into movement by any known means. The throbber 37 visually twitches causing larger local air disturbances than the pulsing fluid through the deformable container. A number of subtle effects may also be caused by the throbbing and squirming of the imitation blood vessels, any one or combination of which may be detectable by the biting insects. These include the dimensional, positional, and thermal changes described above, which themselves may give rise to thermal emanations detectable by the insects, or alternatively, they may influence or modulate acoustic and thermal emanations issuing from the insects themselves, which influences or modulations are then detected by the insects.

The degree of attraction exhibited by devices built in accordance with principles of the present invention varies depending upon structural design. Even the supply reservoir 32, which is elastic-walled, filled with fluid and subject to some pulsing movement will attract some insects. Greater attraction is exhibited by the throbber coil 37 and the greatest attraction is had with the simulated artery-capillary vascular system through which warm fluid flows in pulses. Obviously, the warm fluids could be replaced by cold fluid, compressed air, or a mechanical or electromechanical actuator and heat could be supplied by radiation, or conduction from a separate source, or generated directly by passage of electrical current.

While a fluid-mechanical device has been described to attract insects, it is possible to achieve similar physical effects produced by a purely mechanical or electromechanical device. Such device has the advantage of not requiring a liquid-tight container, being lighter and less expensive to construct and providing more precise control in developing the vibratory "signature" earlier discussed. To this end, an alternative embodiments of the present invention are shown in FIGS. 4–12 which illustrate simplified mechanical or electro-mechanical devices for attracting biting insects.

Figure 4:
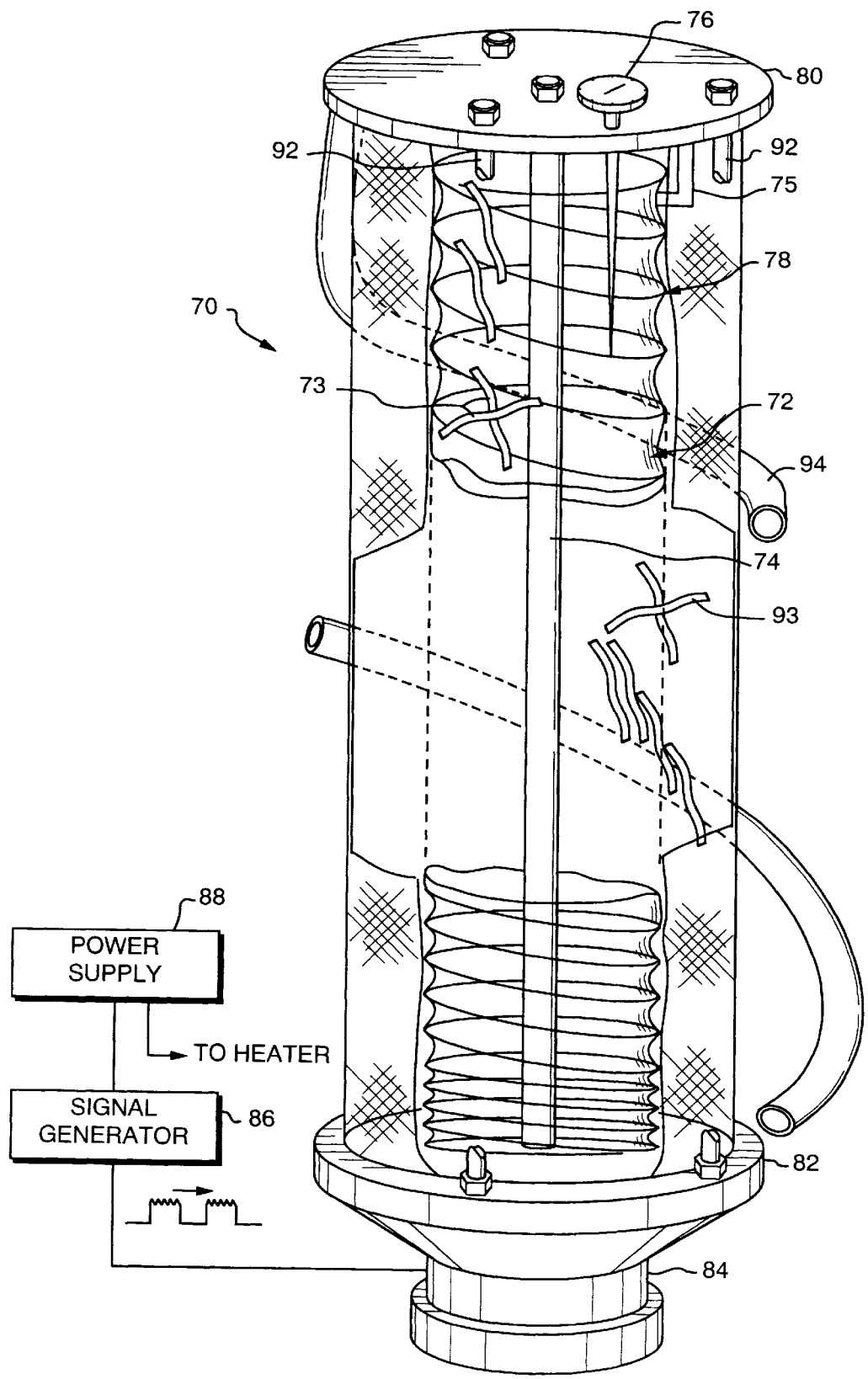
FIG. 4 is an idealized partial cross-sectional perspective view of an alternative embodiment of the present invention.

FIG. 4 is an idealized exploded view of the purely mechanical device formed in accordance with the present invention. The device 70 preferably includes a heated surface 72. The surface 72 may be self heating, or may contain a heater 74, or the surface may be supplied with heat from a separate source altogether via radiative, conductive, or convective heat transfer. In the embodiment shown, heat is supplied by radiation and convection from a central rod heater 74 controlled by a thermostat 76. Heat could also be developed by ohmic heating of the device itself, by combustion of a fuel, by doing mechanical work against friction, or any other known means.

To further develop the "signature" found attractive to mosquitoes and other biting insects, surface 72 is capable of deformation at the low mechanical frequencies and amplitudes which have been found to be attractive to mosquitoes and other biting insects. More specifically, surface 72 may be deformed to execute oscillations of a predetermined waveform and spatial/temporal pattern (e.g. traveling waves, or progressive "phi-effect" waves), and develop spatial and temporal temperature variations or patterns (e.g. reticulations or stripes) over the oscillating surface which has been found to be attractive to the insects. It is this slow-wave oscillating structure which simulates to a degree deformations of the skin of a prey animal due to myomechanical and vascular-mechanical vibrations and dimension changes that is the objective of the simulator of the device.

In the preferred embodiment, skin-like surface 72 comprises a thin plastic foil, sheet, or shrink film. The surface 72 may also include strips of foil or tinsel 73 randomly applied thereto to break up the heat pattern provided to the surface; however, it has been found more effective to apply the strips of foil or other heat conducting material 73 to the cloth cover 90, as described below. To provide a skeleton and transmit vibratory motion to the surface 72, the device includes a spring 78. The plastic foil 72 is wrapped around the weak mechanical spring 78 which has a large distributed mass that is capable of transmitting displacement waves along its length at relatively low speed. Such a mechanical slow-wave spring structure simulates to a degree the myomechanical and vascular-mechanical vibrations and dimension changes that characterize a prey animal's living skin. The displacements and vibrations of this spring 78, which may vary from place to place, are transmitted to the relatively weak and compliant plastic foil surface 72, which is then forced to follow the desired, predetermined complex oscillatory pattern imparted thereon by the slow wave spring structure.

In the preferred embodiment, the spring 78 comprises approximately 45 turns of a standard 2 ¾" dia. weak mechanical spring suspended at one end from an upper support 80. due to the distributed weight and weakness of the spring, the turns stretch the spring and pull down a number of turns toward a lower support 82, where the excess turns of the spring are allowed to "pool" together. Based upon the specific vibratory parameters to be met, a larger or smaller mass of pooled turns may be utilized. In the resulting column of stretched turns, where spring tension is balanced turn-by-turn against gravity, traveling waves of displacement can be propagated. As will be appreciated by those skilled in the art, there are many other combinations of springs and masses in which slow waves of mechanical displacement can be propagated. The important aspect of the invention is that vibrations are impressed on the weak and nearly massless surface 72. It is also contemplated that the surface of the spring itself could be used as the surface 72. However, a separate skin or surface is used in the preferred embodiment to increase the effective area of the spring 78 and also to intercept, disperse, and retain the heat generated from the central heater 74.

The preferred embodiment also includes a device for driving or exciting vibrations to the wave transmitting system comprising the spring 78 and surface 72. In the preferred embodiment, the vibration generator comprises a current-to-displacement transducer 84 which transforms electrical oscillations produced by a signal generator 86 connected to a power source 88 into corresponding longitudinal and lateral oscillations of the spring 78, which are then communicated to the surface 72. The combination of elements comprising the wave transmitting system can be enclosed in a decorative or protective cloth cover 90 attached to support rods 92. The support rods 92 maintain the spatial relationship of the upper and lower support. As earlier described, the cloth cover may include a pattern specifically chosen to enhance attraction of insects, e.g., a black and white striped cloth. Wires, tubing or strips of foil 93 may be applied to the interior or exterior of the cloth cover 90 to break up the heat pattern and provide other elements of the signature associated with animal or human skin. As earlier discussed with respect to the fluid-mechanical device described and shown in FIG. 2, the mechanical device illustrated in FIGS. 4–9 may also include a throbber 94. The throbber may be constructed from a separate spring or straps of spring steel which may be actuated to vibrate at a desired frequency and amplitude. The throbber 94 will visually twitch causing larger local air disturbances than the spring 78 or membrane 72 to attract insects to the device.

It will be appreciated by those skilled in the art that the function of the slow-wave or vibratory transmitting system is not to produce sound, as in a conventional loudspeaker, but rather to produce subtle deformations and displacements of the skin-like surface 72 which are readily detectable at a distance by the insects. The detection of such surface deformations by insects is accomplished by complex means which is taken advantage of by the devices disclosed herein, such devices being designed to develop an effective imitation of a living animal's skin or "signature".

The insect attracting device 70 operates by exciting the transducer 84 to launch groups of waves of periodic displacement up the spring 74. The displaced and vibrating waves travel up the spring 74, reach the upper support 30, and are reflected back toward the source, in the well-known manner of transmission lines, and encounter later sets of displacement waves generated by the transducer. Preferably, the displacement waves are created by trains of intermittent electrical oscillations (with energy in the band from approximately 5 to 50 Hz), resulting in a constantly shifting pattern of small, trembling mechanical vibrations which resemble those of prey-animal skin.

It will be appreciated by those skilled in the art that the coupling of the vibrations to the air is very inefficient. There is evidence of some small air displacement waves (slow-traveling pressure waves) but, for the most part, the device operating in accordance with the present invention generates no detectable energy above random background being propagated as sound proper, where sound is defined as alternate rarefactions and condensations being propagated at the characteristic velocity for the sound carrying medium (e.g. 1100 ft/sec. for air). Indeed, the amplitude of the oscillations of surface 72 are quite small, typically less than 10 microns in amplitude. These surface oscillations can barely be seen in light beams bouncing off the surface and can barely be felt when the surface 72 is lightly held in the fingertips. The velocity of the traveling waves generated by the device of the present invention is preferably on the order of 10–100 feet per second. The vibratory disturbances are nothing like those propagated by a "woofer" speaker intended to develop sound and, indeed, the same oscillations, when coupled to the air by a loudspeaker, are believed to have no insect attracting ability whatsoever. Additionally, the device may include a means for adjusting the decay rate of amplitude of vibration such as an adjustable member 75 which contacts the surface 72.

While the preferred embodiment provides an electrically generated train of pulses intermittently supplied at a predetermined burst rate (e.g. 1 Hz), it is envisioned that the generation of waves does not necessarily need to be at a constant rate since the motions of prey animal skin generally do not show any direct link to a particular cadence. It is also envisioned that the electrical driver of the preferred embodiment which includes separate controls for burst rate, ringing frequency, amplitude, decay rate, etc., while extremely useful for experimentation since it can force a variety of oscillations, may take the form of a much simpler electrical or straight-mechanical driver, such as a solenoid, a clapper, a hammer, or a pressure-responsive diaphragm driving an appropriately dampened resonant system. A free-hammer device could even be made by exciting the spring with falling pieces of solid material, falling chain links or drops of falling water.

Other simplifications and combinations are likewise contemplated. For example, the spring coil could be made self-heating by supplying a current thereto. If the current is intermittently applied to the spring, the resulting impulsive magnetic effects would create a "jumping spring" to provide the oscillations to the skin-like membrane surrounding the spring. The oscillations are readily maintained by door-bell-like switch contacts operated by the spring, or by modern optical or semiconductor switch equivalents. The vibration transmitting system may also be excited by applying current thereto either constantly or intermittently to impart vibrations therein.

Figure 5:
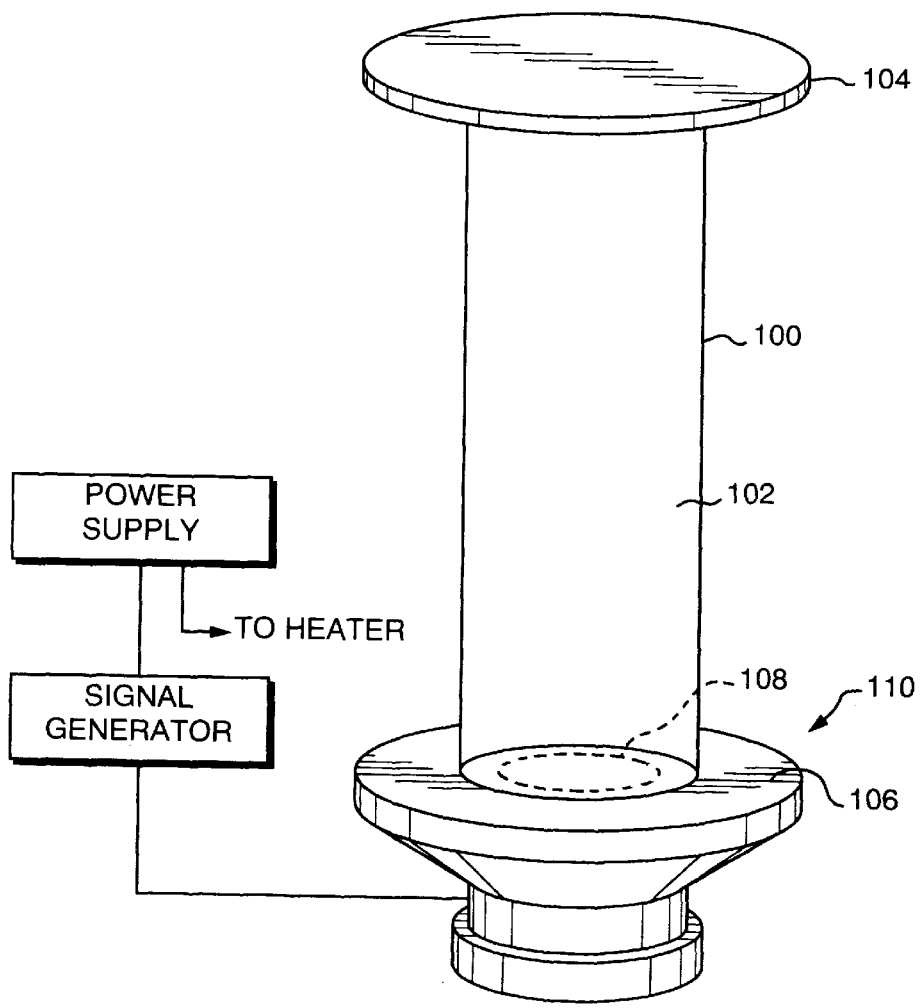
FIG. 5 is an idealized perspective view of a further embodiment of the present invention.

Likewise, referring to FIG. 5, the vibration wave transmitting system may be formed from a flexible walled container or bag 100 filled with a liquid or semi-solid gel 102, the container being suspended from a support 104. Either a mechanical or electrical vibration generator 106 would impart vibration waves to the flexible walled container 100 to create a "signature" of a prey animal's skin. The device may similarly include a heater 108 which may be positioned in a lower support 110 or any other convenient location.

Figure 6:
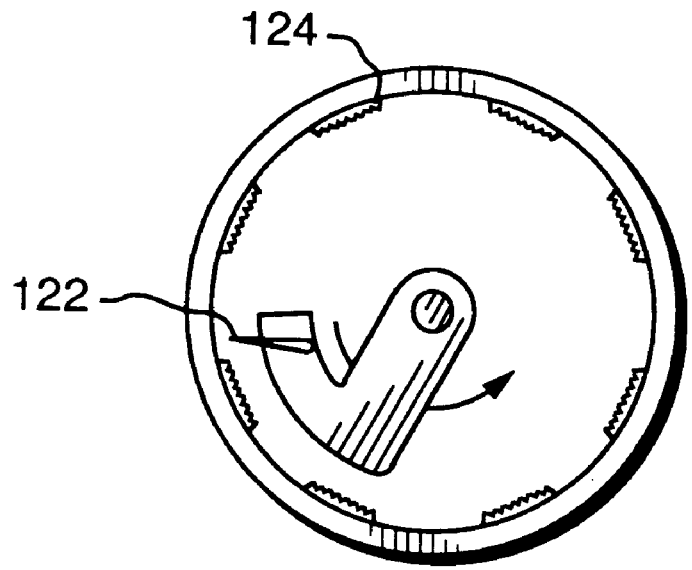
FIG. 6 is an idealized partial cross-sectional view of a still further embodiments of the present invention.

Still a further embodiment of the present invention to accomplish the generation and propagation of slow-waves having the desired amplitude, frequency and velocity are illustrated in FIGS. 6 through 9. FIG. 6 illustrates an apparatus which generally generates minute vibrations on the surface of a deformable member 120 by a stylus 122 mechanically contacting an internally ribbed surface 124 (either axially or radially formed in the membrane) of the deformable member. The stylus 122 may be moved along the deformable member inner surface either axially or radially to create the vibrations. The stylus may be in the form of a savart wheel having a generally gear-like outer surface. As earlier described, the deformable member may be heated by any known means to improve attractiveness of biting insects.

Figure 7:
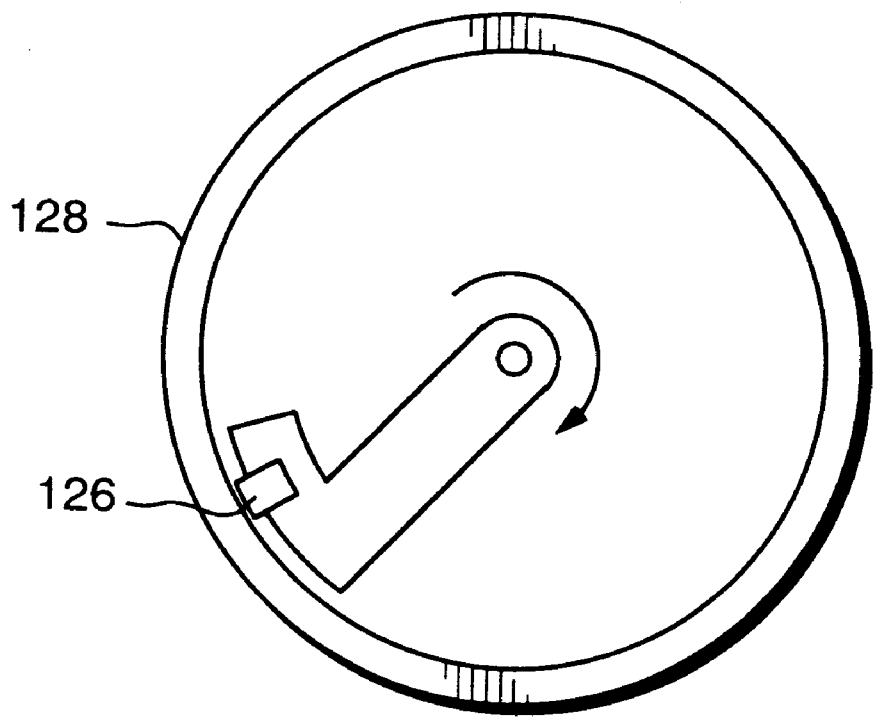
FIG. 7 is an idealized cross-sectional view of yet another embodiment of the present invention.
Figure 8:
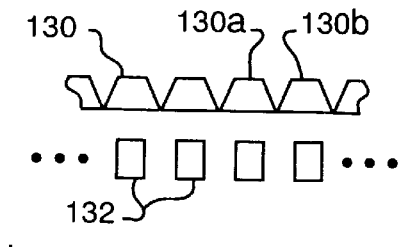
FIG. 8 is an idealized cross-sectional view of yet another embodiment of the present invention.

As illustrated in FIG. 7, the minute oscillations may also be produced by moving a small magnet 126 past a deformable surface 128 which includes closely set stripes of alternately-poled magnetic material (e.g. flexible refrigerator magnetic material or magnetic door gasket material). As shown in FIG. 8, the oscillations may be imparted on a heated deformable surface 130 by the progressive excitation of an array of electromagnets 132 set in proximity to sufficiently mechanically independent areas 130a, 130b of a deformable magnetic surface.

Figure 9:
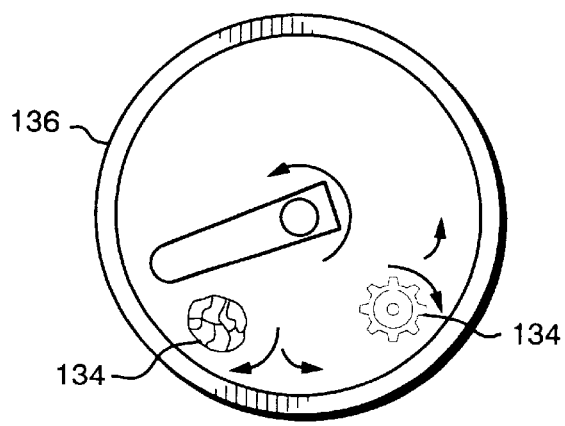
FIG. 9 is an idealized cross-sectional view of yet another embodiment of the present invention.

As shown in FIG. 9, the vibrations may be generated by the rolling of faceted balls or gravel, gears or pulleys 134 on the deformable surface 136. It will be appreciated by those skilled in the art that in each instance, the deformable surface is induced to deform locally in a desired oscillatory manner, and the excitation device allows such deformed and vibrating areas to be moved about or selectively excited as desired to simulate the "signature" of prey animal skin. Each device may include a separate collector or killing device for trapping or killing insects attracted into a predetermined area.

Figure 10:
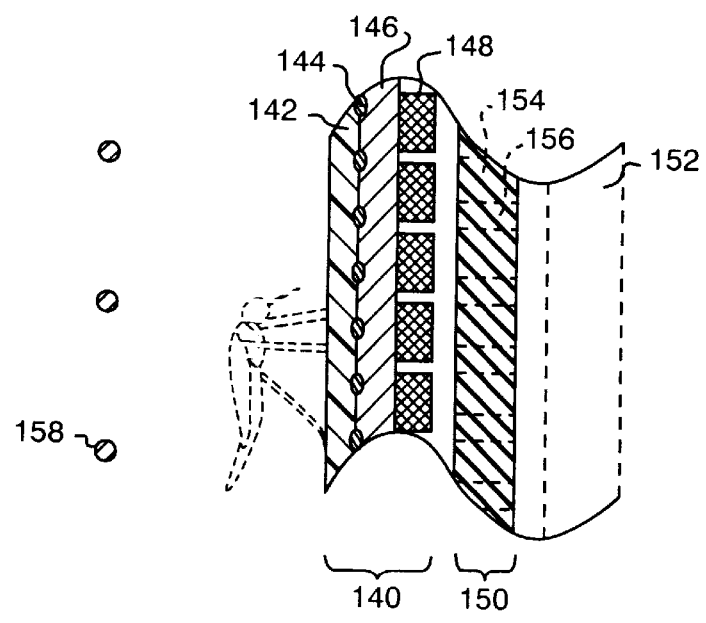
FIG. 10 is a cross-sectional view illustrating the different layers of the insect attracting apparatus of the present invention.
Figure 11:
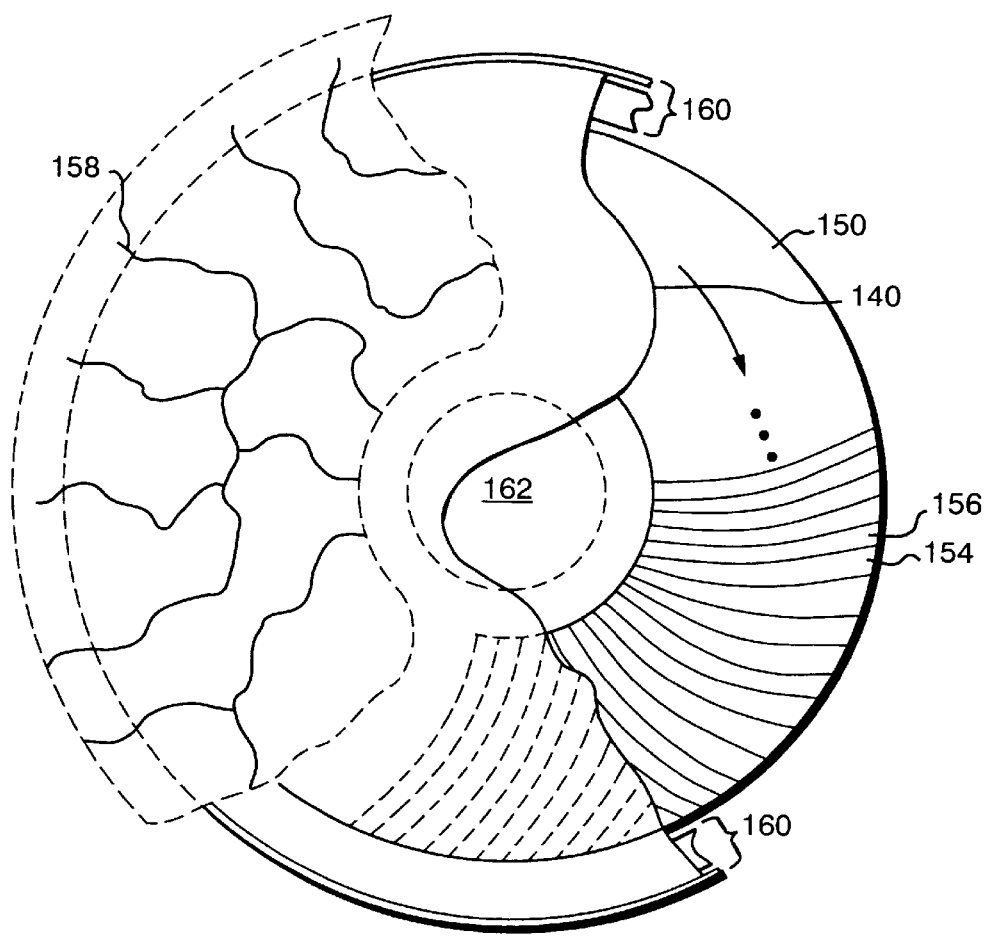
FIG. 11 is a partial cross-section of a top plan view of the apparatus shown in FIG. 10.
Figure 12:
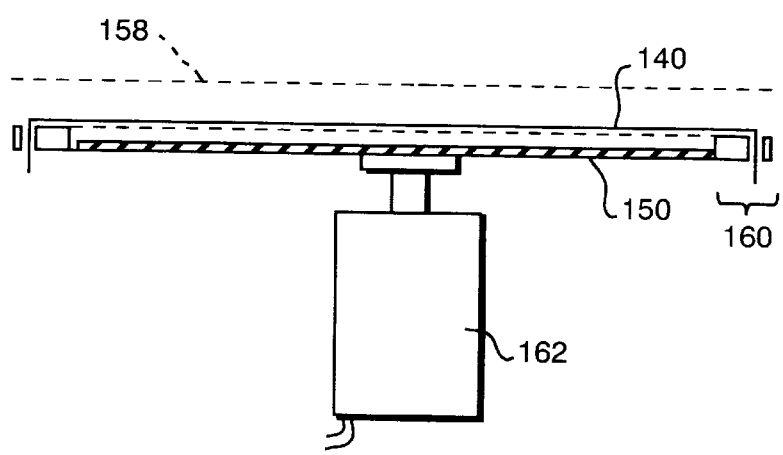
FIG. 12 is a side elevational view of the apparatus shown in FIGS. 10 and 11.

In a still further embodiment of the present invention illustrated in FIGS. 10–12, the "signature" characteristic of the animal skin may be imparted directly in the collecting or killing apparatus. By combining the attracting and collecting functions, the apparatus may be simplified for manufacturing and commercialization.

FIG. 10 is a partial cross-sectional view illustrating the different layers of a deformable skin-like surface integrated with a killing or collecting device and an excitation device for imparting vibrational motion or traveling waves to the deformable surface. The removable or demountable deformable surface 140 comprises a plurality of layers including a killing or adhering layer 142, a heating or patterning layer 144, a support layer 146, and a magnetic driving layer 148. The killing or adhering layer 142 may be a deformable substrate, such as plastic, rubber or paper, coated with a collecting/killing agent. The collecting agent may take the form of an adhesive similar to that used on fly paper and the killing agent may be an insecticide or an electrical killing grid.

The heating or patterning layer 144 may include an electrical resistance heater or a substrate having thereon heat conductive strips or the like for creating a random heating pattern to the device. In the embodiment of FIGS. 10–12, the "signature" characteristic of animal skin is generated by rotating magnetic fields from permanent magnets or electromagnets to create a "movement" in the deformable surface 140. In the illustrated embodiment, the magnetic driving layer 148 comprises either a flexible magnetic rubber sheet having alternating polarity ribs thereon or a sheet of flexible substrate having a magnetic or magnetized material sprayed or silk-screened thereon in any suitable pattern.

The exciter or moving element 150 which imparts movement to the deformable surface may either be driven to move relative to the surface by a motor or clockwork or it may be a separate force generating element 152 which may be conducted or mediated by the moving element 150 to the deformable surface. More specifically, moving element 150 creates a relative motion "in shear" to the deformable surface 140 which can be arranged by any suitable rotating or translation mechanism. As shown in FIG. 10, the moving element 150 may be a sheet of magnetized rubber with alternating polarity ribs 154, 156 for generating an excitation force. Alternatively, the moving element 150 may be a mask or patterned set of conductors and/or insulators to generate the excitation force.

The device preferably also includes an overlying pattern of random-line "capillaries" 158 to breakup the uniformity of the heat pattern exhibited by the deformable surface. This random pattern may take many different forms. As shown in FIGS. 11–12, the pattern is created using randomly oriented heat conducting material members, such as foil or tinsel, adhered to a cloth cover. The patterning may also be incorporated directly into the deformable surface 140.

FIGS. 11 and 12 are a partial sectional top plan view of the insect attracting device and a side elevational view, respectively. As shown in FIGS. 11 and 12, the moving element 150 may be driven by a motor 162. The deformable surface 140 may be mounted on a holding ring or clamp frame 160 to maintain a desired shape, e.g., flat disc, cylindrical or any other suitable shape. The clamp frame 160 may also be suitable for use as a "throbber" as earlier described, to impart larger vibrational motions to the device. The throbbing action may be generated by flexing the deformable surface 140, flexing the clamp frame 160 or tapping the frame with a mechanical hammer, such as a doorbell-clapper.

Providing heat to the device of FIGS. 10–12 may be accomplished by several methods. For example, heat could be generated by ohmic heat in the removable deformable surface by means of current passing through a resistive coating or it could be radiated and conducted to the deformable surface by a heater made a part of the exciter.

In operation, the removable deformable surface including the collector/killing layer 142 can be removed and replaced once it becomes loaded or exhausted. A new sheet of collector/killer layer may be adhered to the other layers of the deformable surface or an entirely new deformable surface may be placed on the device thereby restoring the system to its initial unloaded or unexhausted state. Alternatively, it is contemplated that the collector/killing layer or sheet 142 could also be automatically replaced using a scroll system having a supply roll and a take-up roll. The active surface would be unrolled across the attractor surface and either manually or automatically, e.g., controlled by a timing mechanism or load detecting device, to provide a new portion of the layer extended across the attractor surface. Thus, the catch may be preserved for analysis and data collection. Accordingly, in the device illustrated in FIGS. 10–12, the exciter is separate from the attractor surface making it possible to generate the characteristic "signature" of a prey animal's skin and allow the attractive surface, including the collector/killing layer, to be discarded and replaced from time to time as required to maintain optimum performance.

Although many components have been described to create the insect attracting device of the present invention, the key feature of the device is to simulate the patterned temporal and spatial "signature" of prey animal skin in sufficient detail to attract insects.

Accordingly, the invention should not be limited to the details of the embodiments described, but only by the spirit and scope of the appended claims.

What is claimed is:

1. An apparatus for the control of biting insects comprising:
    a fluid-filled flexible walled container;
    an exciter for imparting a traveling wave to the fluid-filled flexible walled container to simulate movement of a prey animal's skin to attract insects to the apparatus; and
    a heater for heating the fluid.

2. An apparatus as defined in claim 1, wherein the fluid is a gel.

3. An apparatus as defined in claim 1, wherein the fluid is a semi-solid.

4. An apparatus for the control of biting insects comprising:
    a vibration wave generator;
    a vibration wave transmitting member coupled to the vibration wave generator, the vibration wave transmitting member comprising a flexible walled container filled with one of a liquid and a semi-solid gel which is vibrated at a frequency and amplitude to attract insects to the apparatus; and
    a heater for heating the container and/or the liquid or semi-solid gel.

5. An apparatus as defined in claim 4, wherein the container is suspended from a support member.

6. An apparatus as defined in claim 4, wherein the vibration wave generator comprises one of a transducer and a mechanical driver.

7. An apparatus as defined in claim 4, wherein the vibration wave generator generates bursts of oscillations at a frequency of approximately 5 to 50 Hz and a burst rate of approximately 1 Hz.

8. An apparatus as defined in claim 4, wherein the amplitude of vibration is generally less than 10 microns.

9. An apparatus as defined in claim 4, further including a thermostat coupled to the heater to maintain a desired temperature.

10. An apparatus for the control of biting insects comprising:
    a vibration wave generator;
    a vibration wave transmitting member coupled to the vibration wave generator, the vibration wave transmitting member comprising a flexible walled container filled with one of a liquid and a semi-solid gel which is vibrated at a frequency and amplitude to attract insects to the apparatus, wherein the vibration wave transmitting member includes a pattern forming cover therearound to simulate spatial features and discontinuities of a prey animal's skin, wherein the cover includes one of foil strips and wires thereon.

* * * * *